(12) United States Patent
Katsura et al.

(10) Patent No.: US 8,493,850 B2
(45) Date of Patent: Jul. 23, 2013

(54) COMMUNICATION APPARATUS AND FRAME TRANSMISSION METHOD

(75) Inventors: Yuichiro Katsura, Fukuoka (JP); Tetsuo Ehara, Fukuoka (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 12/894,813

(22) Filed: Sep. 30, 2010

(65) Prior Publication Data
US 2011/0075559 A1 Mar. 31, 2011

(30) Foreign Application Priority Data
Sep. 30, 2009 (JP) .................................. 2009-228848

(51) Int. Cl.
*H04L 12/26* (2006.01)
(52) U.S. Cl.
USPC ......................................................... 370/230
(58) Field of Classification Search
None
See application file for complete search history.

(56) References Cited

U.S. PATENT DOCUMENTS
6,807,179 B1 * 10/2004 Kanuri et al. ............ 370/395.31
2009/0225752 A1 9/2009 Mitsumori

FOREIGN PATENT DOCUMENTS
JP 2007-180891 7/2007
JP 2009-212879 9/2009

OTHER PUBLICATIONS
"Japanese Office Action" mailed by JPO and corresponding to Japanese application No. 2009-228848 on Aug. 16, 2011, with English translation.

* cited by examiner

*Primary Examiner* — Minh-Trang Nguyen
(74) *Attorney, Agent, or Firm* — Fujitsu Patent Center

(57) ABSTRACT

A communication apparatus is connected to a network and identifies a flow of a frame input thereto and outputs the frame to a port. The communication apparatus includes: a flow identifying unit that obtains a flow identifier of the flow to which the frame belongs, and that obtains, based on the flow identifier, a hash rule corresponding to the flow identifier; a transfer destination controller that obtains by calculation a hash value of the frame by making use of the hash rule obtained by the flow identifying unit and that decides on an output port for the frame based on combination of the flow identifier and the hash value; and a frame output unit that outputs the frame to the output port decided by the transfer destination controller.

9 Claims, 15 Drawing Sheets

FIG.3

FLOW IDENTIFYING
TABLE
211

| TYPE OF SERVICE | FLOW ID | FLOW INFORMATION ||
| | | HASH EXECUTION DETERMINATION FLAG | OFFSET INFORMATION |
|---|---|---|---|
| SERVICE TYPE 1 | FLOW ID #AA | ON | OFFSET #AA |
| ⋮ | ⋮ | ⋮ | ⋮ |
| SERVICE TYPE 2 | FLOW ID #BB | ON | OFFSET #BB |
| ⋮ | ⋮ | ⋮ | ⋮ |
| SERVICE TYPE 3 | FLOW ID #CC | ON | OFFSET #CC |
| ⋮ | ⋮ | ⋮ | ⋮ |
| SERVICE TYPE 4 | FLOW ID #DD | OFF | 0 |
| ⋮ | ⋮ | ⋮ | ⋮ |
| UNREGISTERED SERVICE TYPE | FLOW ID #XX | ON | 0 |

FIG.4

HASH RULE TABLE
212

| FLOW ID | HASH RULE |
|---|---|
| FLOW ID #AA | MPLS LABEL |
| ⋮ | ⋮ |
| FLOW ID #BB | VID |
| ⋮ | ⋮ |
| FLOW ID #CC | IP ADDRESS AND MAC ADDRESS |
| ⋮ | ⋮ |
| FLOW ID #DD | PREDETERMINED HASH VALUE |
| ⋮ | ⋮ |
| FLOW ID #XX | MAC ADDRESS |

FIG.5

DESTINATION CONTROL TABLE
215

| FLOW ID/HASH VALUE | PHYSICAL LINE PORT NUMBER |
|---|---|
| FLOW ID #AA, HASH VALUE #AA | PHYSICAL LINE PORT #0 |
| ⋮ | ⋮ |
| FLOW ID #BB, HASH VALUE #BB | PHYSICAL LINE PORT #1 |
| ⋮ | ⋮ |
| FLOW ID #CC, HASH VALUE #CC | PHYSICAL LINE PORT #2 |
| ⋮ | ⋮ |
| FLOW ID #DD, HASH VALUE #DD | PHYSICAL LINE PORT #3 |
| ⋮ | ⋮ |
| OTHER (DEFAULT) | PHYSICAL LINE PORT #5 |

FIG.8

FLOW IDENTIFYING TABLE 311

| TYPE OF SERVICE | | FLOW ID | FLOW INFORMATION | | | | |
|---|---|---|---|---|---|---|---|
| | | | HASH EXECUTION DETERMINATION FLAG | MPLS OFFSET | IP OFFSET | VLAN OFFSET | ADDITIONAL INFORMATION |
| SERVICE TYPE 1 | TYPE: 0x8847 LABEL LEVEL: 3 | 1 | 1 | 12 | 0 | 0 | 3 |
| | ... | ... | ... | ... | ... | ... | ... |
| SERVICE TYPE 2 | TPID: 0x8100 VID: 0x001 | 10 | 1 | 0 | 0 | 12 | 0 |
| | TPID: 0x8100 VID: 0x010 | 11 | 1 | 0 | 0 | 12 | 0 |
| | ... | ... | ... | ... | ... | ... | ... |
| SERVICE TYPE 3 | TPID: 0x8100 VID: DON'T CARE | 19 | 0 | 0 | 0 | 0 | 0 |
| | TYPE: 0x0800 IP DA: 0x10203040506 | 20 | 1 | 0 | 26 | 0 | 0 |
| | ... | ... | ... | ... | ... | ... | ... |
| SERVICE TYPE 4 | MAC DA: 0x123456789ABC MAC SA: 0xDEF00FEDCBA9 | 30 | 1 | 0 | 0 | 0 | 0 |
| | ... | ... | ... | ... | ... | ... | ... |
| UN-REGISTERED SERVICE TYPE | — | 0 | 1 | 0 | 0 | 0 | 0 |

FIG.9

HASH RULE TABLE
312

| FLOW ID | HASH RULE |
|---------|-----------|
| 0 | MAC ADDRESS |
| 1 | MPLS LABEL |
| 10 | VID |
| 11 | VID |
| ⋮ | ⋮ |
| 19 | PREDETERMINED HASH VALUE (0) |
| ⋮ | ⋮ |
| 20 | MAC ADDRESS AND IP ADDRESS |
| ⋮ | ⋮ |
| 30 | FLOW ID |
| ⋮ | ⋮ |

FIG.10

DESTINATION CONTROL TABLE ~315

| FLOW ID | HASH VALUE | PHYSICAL LINE PORT NUMBER |
|---|---|---|
| 0 | 0 | 0 |
|  | 1 | 1 |
|  | -- | -- |
|  | 7 | 7 |
| 1 | 0 | 0 |
|  | 1 | 1 |
|  | -- | -- |
|  | 7 | 7 |
| ⋮ | ⋮ | ⋮ |
| 10 | 0 | 2 |
|  | 1 | 2 |
|  | -- | -- |
|  | 7 | 2 |
| 11 | 0 | 0 |
|  | 1 | 1 |
|  | -- | -- |
|  | 7 | 7 |
| ⋮ | ⋮ | ⋮ |
| 19 | 0 | 0 |
|  | 1 | 1 |
|  | -- | -- |
|  | 7 | 7 |
| 20 | 0 | 3 |
|  | 1 | 3 |
|  | -- | -- |
|  | 7 | 3 |
| ⋮ | ⋮ | ⋮ |
| 30 | 0 | 7 |
|  | 1 | 7 |
|  | -- | -- |
|  | 7 | 7 |
| ⋮ | ⋮ | ⋮ |

FIG.15

LAG CONTROL TABLE
31

| LAG TYPE | HASH RULE |
|---|---|
| LAG #A | MAC ADDRESS |
| LAG #B | IP ADDRESS |

COMMUNICATION APPARATUS AND FRAME TRANSMISSION METHOD

CROSS-REFERENCE TO RELATED APPLICATION(S)

This application is based upon and claims the benefit of priority of the prior Japanese Patent Application No. 2009-228848, filed on Sep. 30, 2009, the entire contents of which are incorporated herein by reference.

FIELD

The embodiments discussed herein are directed to a communication apparatus.

BACKGROUND

In recent years, a technology known as link aggregation (LAG) is prevalent, in which a plurality of physical lines are collectively treated as a single virtual line. For example, in the LAG technology, N number of physical lines each having the communication band of 100 Mbps are bundled together and treated as a virtual line having the communication band of 100 Mbps×N.

The use of LAG allows for a flexible and efficient network construction. For example, even in case a trouble occurs in one of the physical lines bundled in a virtual line, the communication can be carried on without interruption by making use of the other physical lines that are working without trouble. Besides, the LAG technology is not limited for the processing of a single type of service and can be implemented in order to collectively process various types of services such as VLAN over Ethernet (registered trademark) (VLAN stands for virtual LAN), IP over Ethernet (registered trademark) (IP stands for Internet protocol), and MPLS over Ethernet (registered trademark) (MPLS stands for multi protocol label switching). In other words, the LAG technology enables transmission of frames having different types of services through a single virtual line.

However, in case the frames happen to be concentrated at only some of the physical lines bundled using the LAG technology, then the remaining physical lines remain unused and the communication band constructed using the LAG technology is not used in an effective manner. Conventionally, in order to prevent concentration of frames at only some physical lines, the frames are divided among all of the physical lines.

Explained below is a conventional network configuration in which the LAG technology is implemented. FIG. 11 is an exemplary configuration diagram of a conventional network. As illustrated in FIG. 11, the network includes user terminals 10a to 10h and communication apparatuses 20a to 20f. In the following explanation, the user terminals 10a to 10h are representatively referred to as a user terminal 10; and the communication apparatuses 20a to 20f are representatively referred to as a communication apparatus 20.

The user terminal 10 transmits frames to various destinations via the communication apparatuses 20 and receives frames transmitted by the other user terminals 10 via the communication apparatuses 20. The communication apparatus 20 receives frames transmitted by the user terminals 10 and, based on the address information and the like stored in each frame, transfers the frames to the corresponding destinations. For example, when the user terminal 10 transmits a frame, the communication apparatus 20 performs frame transfer based on a media access control (MAC) address or an IP address stored in the frame.

Explained below is a configuration of the conventional communication apparatus 20 illustrated in FIG. 11. FIG. 12 is a schematic diagram of a configuration of the conventional communication apparatus 20. As illustrated in FIG. 12, the communication apparatus 20 includes line interface (I/F) units 21 to 24, a switch (SW) unit 25, and a controller 26 that is connected to a control terminal 27.

The line I/F units 21 to 24 are connected to a plurality of physical line ports and function as interfaces to external devices for performing frame transmission processing. The SW unit 25 is connected to each of the line I/F units 21 to 24 and provides a switch function for frame transmission between the line I/F units 21 to 24. The SW unit 25 and the line I/F units 21 to 24 transmit/receive data signals of frames or the like.

The controller 26 performs transmission/reception of control signals with the line I/F units 21 to 24 and the SW unit 25 and performs various settings for the line I/F units 21 to 24 and the SW unit 25. Besides, the controller 26 is connected to the control terminal 27 and reports, to the control terminal 27, the information obtained from the line I/F units 21 to 24 and the SW unit 25. Herein, the information obtained from the line I/F units 21 to 24 and the SW unit 25 includes, for example, the information regarding whether a trouble has occurred.

Generally, the line I/F units 21 to 24, the SW unit 25, and the controller 26 illustrated in FIG. 12 are provided in the form of detachable modules or cards. Alternatively, the line I/F units 21 to 24, the SW unit 25, and the controller 26 can also be integrated with the motherboard of the communication apparatus 20.

Explained below is a configuration in which link aggregations are constructed between the communication apparatuses 20 illustrated in FIG. 11. FIG. 13 is a configuration example of communication apparatuses having link aggregations constructed therebetween. In the example illustrated in FIG. 13, link aggregations are constructed between the communication apparatuses 20a and the 20b.

In FIG. 13, line I/F units 21a to 24a and an SW unit 25a disposed in the communication apparatus 20a respectively correspond to the line I/F units 21 to 24 and the SW unit 25 described with reference to FIG. 12. Similarly, line I/F units 21b to 24b and an SW unit 25b disposed in the communication apparatus 20b also respectively correspond to the line I/F units 21 to 24 and the SW unit 25 described with reference to FIG. 12. The line I/F units 23a and 21b include physical line ports #0a to #7a, while the line I/F units 24a and 22b include physical line ports #0b to #7b.

With reference to FIG. 13, the physical lines connected to the physical line ports #0a to #7a are bundled to construct a single virtual line; while the physical lines connected to the physical line ports #0b to #7b are bundled to construct a single virtual line. The physical lines connected to the physical line ports #0a to #7a are collectively referred to as LAG #A, while physical lines connected to the physical line ports #0b to #7b are collectively referred to as LAG #B. The paths in the LAG #A are referred to as work paths, while the paths in the LAG #B are referred to as protection paths. The work paths and the protection paths sometimes go through other nodes. In the example illustrated in FIG. 13, the protection paths connect the communication apparatuses 20a and 20b via a different node 5.

The communication apparatuses 20a and 20b make use of the work paths as active paths and keep the protection paths as backup paths in order to ensure redundancy. That is, when the work paths are functioning normally, the communication apparatuses 20a and 20b transfer frames using the work paths. However, in case the work paths encounter a trouble, the communication apparatuses 20a and 20b change over from the work paths to the protection paths for transferring frames without interruption.

Explained below are flows of frames in a case when the user terminal 10a transfers the frames to the user terminal 10c. Firstly, when the line I/F unit 21a receives a frame from the user terminal 10a, it selects a physical line port for transferring the received frame. More particularly, the line I/F unit 21a calculates a hash value based on a hash rule set in the LAG #A being used and selects a physical line port corresponding to the hash value from among the physical line ports #0a to #7a.

If the physical line port #0a is selected by the line I/F unit 21a, the frame reaches the communication apparatus 20b via the SW unit 25a, the line I/F unit 23a, and the physical line port #0a and then reaches the user terminal 10c via the line I/F unit 21b, the SW unit 25b, and the line I/F unit 23b.

Explained below is a configuration of the line I/F unit 21a illustrated in FIG. 13. FIG. 14 is a schematic diagram of a configuration of a conventional line I/F unit. As illustrated in FIG. 14, the line I/F unit 21a includes a flow identifying unit 30, an LAG control table 31, an LAG hash calculator 32, a transfer destination controller 33, and a central processing unit (CPU) 34. To the CPU 34 is connected a CPU card 35 and to the CPU card 35 is connected an external monitor 40.

regarding a frame obtained from outside, the flow identifying unit 30 outputs that frame to the transfer destination controller 33. The LAG control table 31 is used to store the hash rule set with respect to each LAG. FIG. 15 illustrates an exemplary data configuration of the LAG control table 31. As illustrated in FIG. 15, in the LAG control table 31, LAG types and hash rules are stored in a corresponding manner. Herein, the LAG types represent the information for identifying link aggregations and the hash rules represent the information that specifies the information used at the time of calculating hash values. For example, in the case of transferring a frame using the LAG #A, hash calculation is performed using the MAC address in that frame.

The LAG hash calculator 32 obtains, from the transfer destination controller 33, hash calculation target information and performs hash calculation based on that information. Herein, the hash calculation target information represents, for example, MAC addresses or IP addresses. The LAG hash calculator 32 then outputs the hash values obtained as the calculation result to the transfer destination controller 33. With respect to identical hash calculation target information, the LAG hash calculator 32 calculates the same hash value.

The transfer destination controller 33 makes use of the LAG control table 31 and the LAG hash calculator 32 and determines physical line ports to be used for frame transfer.

More particularly, the transfer destination controller 33 first determines the hash rules by comparing the LAG types to be used in frame transfer with the contents of the LAG control table 31. Subsequently, based on the determined hash rules, the transfer destination controller 33 outputs the hash calculation target information from the frames to the LAG hash calculator 32 and then obtains respective hash values from the LAG hash calculator 32.

For example, if the LAG #A is used for frame transfer, then the hash rule is "MAC address". In that case, the transfer destination controller 33 outputs the MAC addresses of frames to the LAG hash calculator 32 and then obtains respective hash values from the LAG hash calculator 32.

Meanwhile, the transfer destination controller 33 includes a selection table in which the hash values and the physical line ports are stored in a corresponding manner. Thus, the transfer destination controller 33 compares the hash values obtained from the LAG hash calculator 32 with the hash values in the selection table and determines the physical line ports to be used for frame transfer.

The CPU 34 obtains various control signals from the CPU card 35 and accordingly performs settings of the flow identifying unit 30, the LAG control table 31, the LAG hash calculator 32, and the transfer destination controller 33.

Thus, the CPU card 35 outputs various control signals to the CPU 34 so that the CPU 34 can perform settings of the flow identifying unit 30, the LAG control table 31, the LAG hash calculator 32, and the transfer destination controller 33. Besides, the CPU card 35 outputs information such as the setting results to the external monitor 40. As to an example of conventional technology, see Japanese Laid-open Patent Publication No. 2007-180891.

However, in the abovementioned conventional technology, there are times when only some of the physical line ports are used as frame destinations in a concentrated manner. In such cases, even if a plurality of physical lines is present, each physical line is not put to use in an effective manner.

The problem of concentrated use of only some physical line ports as frame destinations arises if the hash calculation target information is identical in a plurality of frames. In that case, the respective hash values obtained as the calculation result are also identical. What causes the abovementioned problem is that the hash values and the physical line ports correspond on one-on-one level.

For example, consider the case of transferring a plurality of frames having different types of services. In that case, if the destination for all frames is identical, then the MAC addresses/IP addresses in those frames are the same. Moreover, if the LAG hash rule is assumed to be the MAC address or the IP address, then the hash value of each frame becomes identical. Because of that, the frames happen to be concentrated at a particular physical line.

SUMMARY

According to an aspect of an embodiment of the invention, A communication apparatus is connected to a network and that identifies a flow of a frame input thereto and outputs the frame to a port, and the communication apparatus includes: a flow identifying unit that obtains a flow identifier of the flow to which the frame belongs, and that obtains, based on the flow identifier, a hash rule corresponding to the flow identifier; a transfer destination controller that obtains by calculation a hash value of the frame by making use of the hash rule obtained by the flow identifying unit and that decides on an output port for the frame based on combination of the flow identifier and the hash value; and a frame output unit that outputs the frame to the output port decided by the transfer destination controller.

According to another aspect of an embodiment of the invention, a frame transmission method of a communication apparatus that is connected to a network and that identifies a flow of a frame input thereto and outputs the frame to a port, the frame transmission method includes: identifying that includes obtaining a flow identifier of the flow to which the frame belongs and obtaining, based on the flow identifier, a hash rule corresponding to the flow identifier; controlling that includes obtaining by calculation a hash value of the frame by making use of the hash rule obtained at the identifying and deciding on an output port for the frame based on combination of the flow identifier and the hash value; and outputting the input frame to the output port decided at the controlling.

According to still another aspect of an embodiment of the invention, a computer readable storage medium has stored therein a frame transfer program, and the program causes a computer to execute a process including: identifying that includes obtaining a flow identifier of the flow to which the frame belongs and obtaining, based on the flow identifier, a hash rule corresponding to the flow identifier; controlling that includes obtaining by calculation a hash value of the frame by making use of the hash rule obtained at the identifying and deciding on an output port for the frame based on combination of the flow identifier and the hash value; and outputting the input frame to the output port decided at the controlling.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates an exemplary data configuration of a flow identifying table according to the second embodiment;

FIG. 4 illustrates an exemplary data configuration of a hash rule table according to the second embodiment;

FIG. 5 illustrates an exemplary data configuration of a destination control table according to the second embodiment;

FIG. 8 illustrates an exemplary data configuration of a flow identifying table according to the third embodiment;

FIG. 9 illustrates an exemplary data configuration of a hash rule table according to the third embodiment;

FIG. 10 illustrates an exemplary data configuration of a destination control table according to the third embodiment;

FIG. 15 illustrates an exemplary data configuration of a conventional LAG control table.

DESCRIPTION OF EMBODIMENT(S)

Preferred embodiments of the present invention will be explained with reference to accompanying drawings. The present invention is not limited to those embodiments.

[a] First Embodiment

Figure 1:
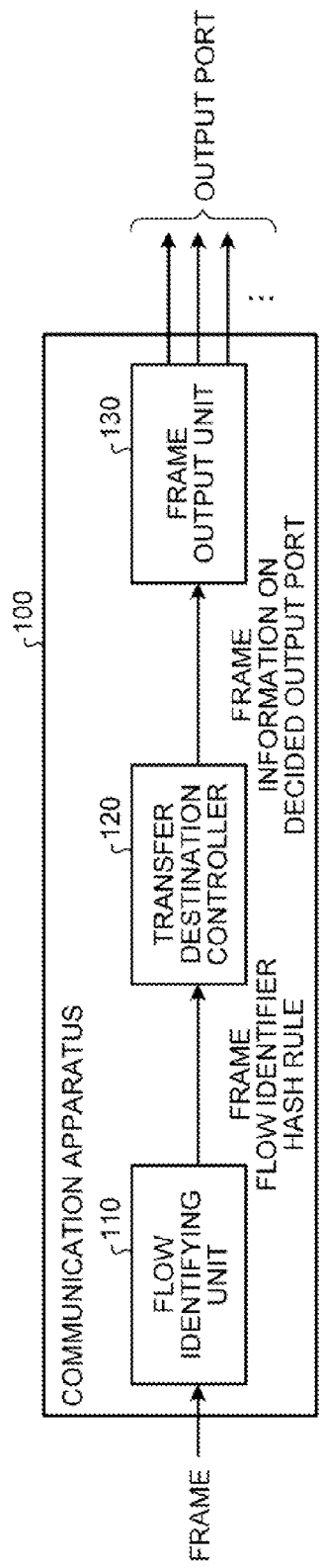
FIG. 1 is a schematic diagram of an exemplary configuration of a communication apparatus according to a first embodiment of the present invention.

Explained below is a configuration of a communication apparatus according to a first embodiment of the present invention. FIG. 1 is a schematic diagram of an exemplary configuration of a communication apparatus according to the first embodiment. As illustrated in FIG. 1, a communication apparatus 100 includes a flow identifying unit 110, a transfer destination controller 120, and a frame output unit 130.

The flow identifying unit 110 obtains flow identifiers of flows to which the input frames belong and, based on the flow identifiers, obtains a hash rule corresponding to each flow identifier.

The transfer destination controller 120 makes use of the hash rules obtained by the flow identifying unit 110 for obtaining by calculation the hash values of the input frames and, based on the combinations of the flow identifiers and the hash values, decides on output ports for the input frames.

The frame output unit 130 outputs the input frames to the output ports decided by the transfer destination controller 120.

Thus, according to the communication apparatus 100, the transfer destination controller 120 decides on the output ports based on the combinations of the flow identifiers and the hash values. Because of that, it is possible to make effective use of a plurality of physical lines.

[b] Second Embodiment

Figure 2:
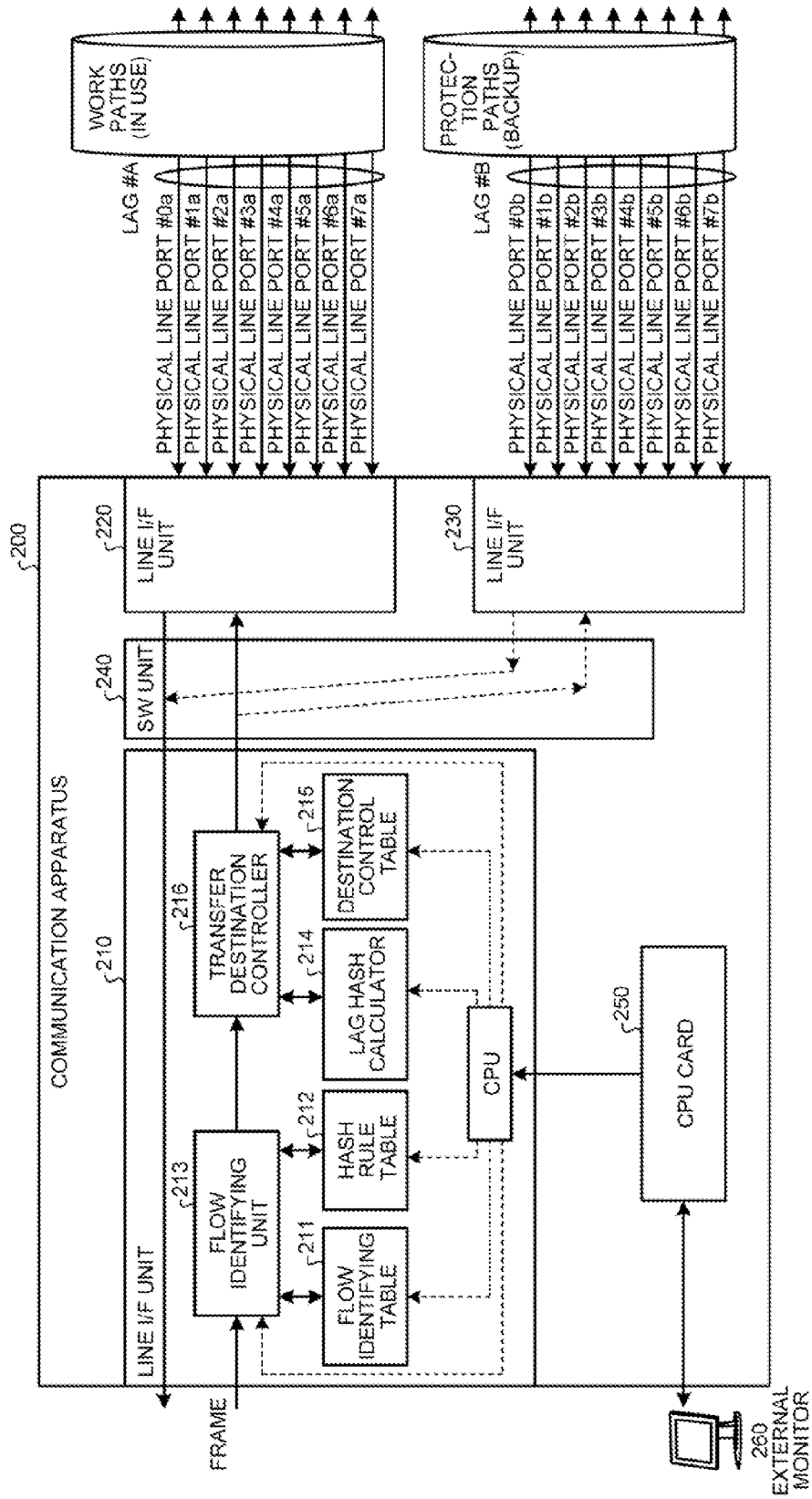
FIG. 2 is a schematic diagram of an exemplary configuration of a communication apparatus according to a second embodiment of the present invention.

Explained below is a configuration of a communication apparatus according to a second embodiment of the present invention. FIG. 2 is a schematic diagram of an exemplary configuration of a communication apparatus according to the second embodiment. As illustrated in FIG. 2, a communication apparatus 200 includes line I/F units 210 to 230, an SW unit 240, and a CPU card 250. The CPU card 250 is connected to an external monitor 260.

The line I/F units 210 to 230 include a plurality of physical line ports and function as interfaces to external devices for performing frame communication processing. Herein, as an example, the line I/F unit 210 includes a plurality of physical line ports connected to an external user terminal; while each of the line I/F units 220 and 230 includes a plurality of physical line ports connected to another communication apparatus.

The line I/F unit 220 includes the physical line ports #0a to #7a. The communication apparatus 200 constructs a single virtual line by bundling the physical lines that are connected to the physical line ports #0a to #7a. Herein, the physical lines connected to the physical line ports #0a to #7a are collectively referred to as LAG #A.

The line I/F unit 230 includes the physical line ports #0b to #7b. The communication apparatus 200 constructs a single virtual line by bundling the physical lines that are connected to the physical line ports #0b to #7b. Herein, the physical lines connected to the physical line ports #0b to #7b are collectively referred to as LAG #B.

The paths in the LAG #A are referred to as work paths, while the paths in the LAG #B are referred to as protection paths. The communication apparatus 200 makes use of the work path as active path and keeps the protection path as backup path in order to ensure redundancy. That is, when the work paths are functioning normally, the communication apparatus 200 transfers frames using the work paths. However, in case the work paths encounter a trouble, the communication apparatus 200 changes over to the protection paths for transferring frames without interruption.

The SW unit 240 is connected to each of the line I/F units 210 to 230 and provides a switch function for frame transmission between the line I/F units 210 to 230. The SW unit 240 and the line I/F units 210 to 230 transmit/receive data signals of frames or the like.

The CPU card 250 performs various settings of the line I/F unit 210 and outputs information such as setting results to the external monitor 260, which in turn displays the information such as the setting results obtained from the CPU card 250.

Generally, the line I/F units 210 to 230, the SW unit 240, and the CPU card 250 as illustrated in FIG. 2 are provided in the form of detachable modules or cards. Alternatively, the line I/F units 210 to 230, the SW unit 240, and the CPU card 250 can also be integrated with the motherboard.

Explained below is a configuration of the line I/F unit 210. As illustrated in FIG. 2, the line I/F unit 210 includes a flow identifying table 211, a hash rule table 212, a flow identifying unit 213, an LAG hash calculator 214, a destination control table 215, and a transfer destination controller 216.

The flow identifying table 211 stores types of services, flow identifications (IDs), and flow information of frames in a corresponding manner. Herein, the types of services represent the types of communication services. More particularly, the types of services include VLAN over Ethernet (registered trademark) (VLAN stands for virtual LAN), IP over Ethernet (registered trademark) (IP stands for Internet protocol), and MPLS over Ethernet (registered trademark) (MPLS stands for multi protocol label switching). It is assumed that the frames input to the communication apparatus 200 include the information for identifying the respective types of services.

A flow ID is an identifier set by the administrator for each type of service. The flow information includes information regarding whether hash calculation is to be performed.

The hash rule table 212 stores the flow IDs and the hash rules in a corresponding manner. The hash rules represent the information that specifies the information used in hash calculation. For example, the hash rules include the MAC addresses or the IP addresses. If a hash rule is set to the MAC address, then the hash value is obtained by performing hash calculation using the MAC address of a frame.

When the flow identifying unit 213 obtains a frame; it determines the flow ID, the flow information, and the hash rule corresponding to that frame, and outputs the determination result along with the frame to the transfer destination controller 216. More particularly, the flow identifying unit 213 compares the type of service of the frame with the contents of the flow identifying table 211 and determines the flow ID and the flow information corresponding to that frame. Then, the flow identifying unit 213 compares the flow ID with the hash rule table 212 and determines the hash rule of that frame.

The LAG hash calculator 214 obtains, from the transfer destination controller 216, hash calculation target information and performs hash calculation based on that information. The LAG hash calculator 214 then outputs the hash values obtained as the calculation result to the transfer destination controller 216.

The LAG hash calculator 214 can calculate hash values by implementing any conventionally known method. For example, the LAG hash calculator 214 can calculate hash values by substituting the hash calculation target information in a predetermined hash function.

The destination control table 215 stores the combinations of the flow IDs and the hash values of frames in a corresponding manner with the physical line ports.

The transfer destination controller 216 receives frames and the respective determination results from the flow identifying unit 213 and accordingly determines the physical line ports to which the frames are to be transferred. Then, the transfer destination controller 216 outputs those frames to the determined physical line ports. More particularly, the transfer destination controller 216 outputs, to the LAG hash calculator 214, the information inside a frame specified by the hash rule thereof and obtains the corresponding hash value from the LAG hash calculator 214. Then, the transfer destination controller 216 determines a physical line port by comparing the hash value and the flow ID of that particular frame with the contents of the destination control table 215.

Explained below is a data configuration of the flow identifying table 211 illustrated in FIG. 2. FIG. 3 illustrates an exemplary data configuration of the flow identifying table 211 according to the second embodiment. As illustrated in FIG. 3, the flow identifying table 211 stores the types of services, the flow IDs, and the flow information of frames in a corresponding manner. Herein, the flow information includes a hash execution determination flag and offset information.

The hash execution determination flag represents information for identifying whether hash calculation is to be performed. More particularly, when the hash execution determination flag for a frame is ON, the hash value of that frame is calculated. On the other hand, when the hash execution determination flag for a frame is OFF, the hash value of that frame is not calculated and a value set in advance is used as the hash value. The offset information represents information that is used by the LAG hash calculator 214 at the time of calculating a hash value. For example, the offset information of frames represents positions in those frames at which the hash calculation target information is stored.

With reference to FIG. 3, for "service type 1" as the type of service of a frame; the corresponding flow ID is "flow ID #AA", the corresponding hash execution determination flag is "ON," and the corresponding offset information is "offset #AA". Similarly, for "unregistered service type" as the type of service of a frame; the corresponding flow ID is "flow ID #XX", the corresponding hash execution determination flag is "ON", and the corresponding offset information is "0".

Explained below is a data configuration of the hash rule table 212 illustrated in FIG. 2. FIG. 4 illustrates an exemplary data configuration of the hash rule table 212 according to the second embodiment. As illustrated in FIG. 4, the hash rule table 212 stores the flow IDs and the hash rules of frames in a corresponding manner.

With reference to FIG. 4, for "flow ID #AA" as the flow ID, the hash rule is "MPLS label"; and for "flow ID #BB" as the flow ID, the hash rule is "VID" (VID stands for VLAN identifier). If the hash rule represents position information, then the information at the specified position information inside the frame is extracted and used for hash calculation.

Moreover, for "flow ID #CC" as the flow ID, the hash rule is "IP address and MAC address"; and for "flow ID #DD" as the flow ID, the hash rule is "predetermined hash value". If the hash rule is "predetermined hash value", then a predetermined hash value is used without performing hash calculation. For "flow ID #XX" as the flow ID, the hash rule is "MAC address".

Explained below is a data configuration of the destination control table 215 illustrated in FIG. 2. FIG. 5 illustrates an exemplary data configuration of the destination control table 215 according to the second embodiment. As illustrated in FIG. 5, the destination control table 215 stores the flow IDs/hash values of frames and the physical line ports in a corresponding manner. The flow IDs/hash values represent the combinations of the flow IDs and the hash values of frames.

For example, for a combination of "flow ID #AA" as the flow ID and "hash value #AA" as the hash value, the physical line port is "physical line port #0". Herein, if frame transfer is performed using the work paths, then the frames are output to the physical line port #0a of the line I/F unit 220. On the other hand, if frame transfer is performed using the protection paths, the frames are output to the physical line port #0b of the line I/F unit 230.

Figure 6:
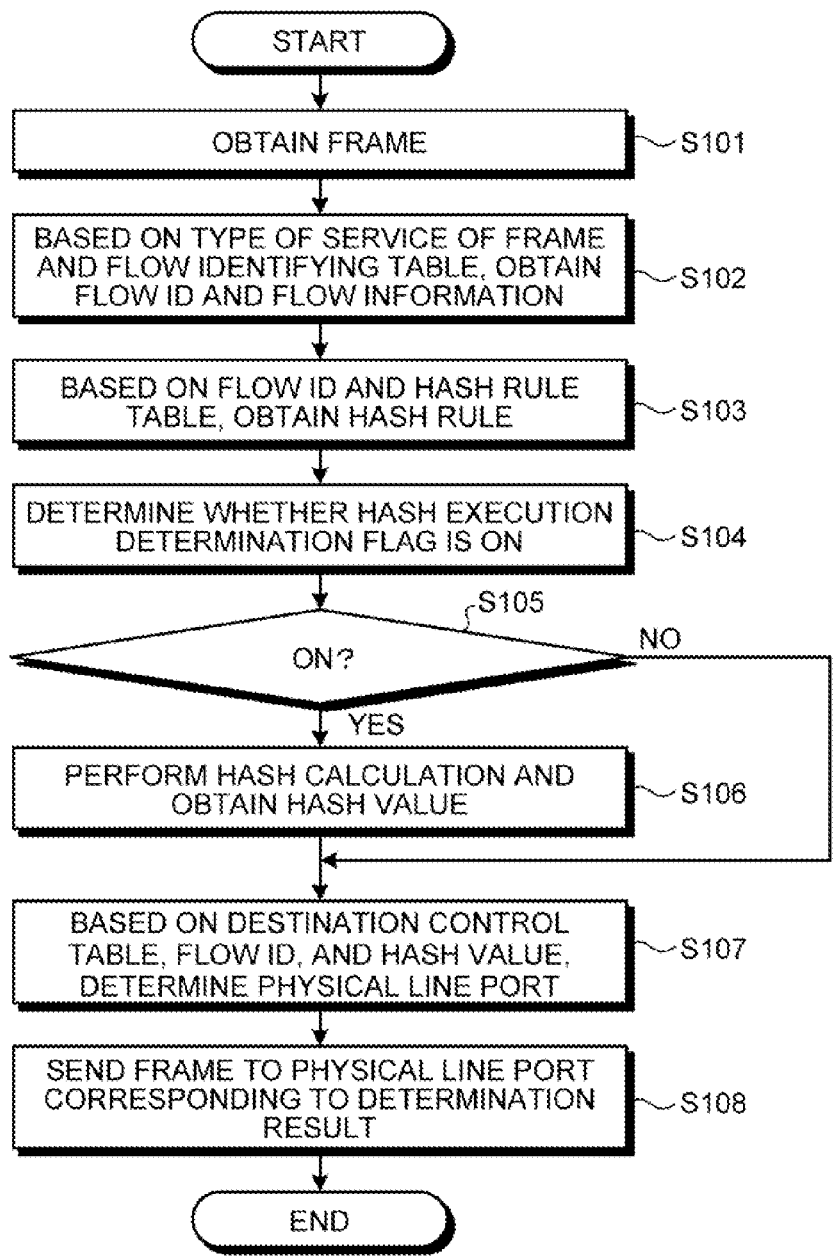
FIG. 6 is a flowchart for explaining the sequence of operations performed by a line I/F unit according to the second embodiment.

Explained below is the sequence of operations performed by the line I/F unit 210 illustrated in FIG. 2. FIG. 6 is a flowchart for explaining the sequence of operations performed by the line I/F unit 210. As illustrated in FIG. 6, the line I/F unit 210 obtains a frame (Step S101) and, based on the type of service of the frame and based on the flow identifying table 211, obtains the flow ID and the flow information of that frame (Step S102).

Subsequently, based on the flow ID and based on the hash rule table 212, the line I/F unit 210 obtains the hash rule of that frame (Step S103) and determines whether the hash execution determination flag included in the flow information is ON (Step S104).

If the hash execution determination flag is OFF (No at S105), the operation proceeds to Step S107. On the other hand, if the hash execution determination flag is ON (Yes at Step S105), the line I/F unit 210 performs hash calculation using the LAG hash calculator 214 and obtains the hash value of that frame (Step S106).

Then, based on the destination control table 215, the flow ID, and the hash value, the line I/F unit 210 determines a physical line port (Step S107) and sends the frame to that physical line port corresponding to the determination result (Step S108).

As described above, based on the combinations of hash values and flow IDs unique to the types of services, the communication apparatus 200 according to the second embodiment selects physical line ports for frame transfer. Hence, even if some frames have an identical destination and even if the hash value of each frame is identical, the frames can be allotted using the respective unique flow IDs.

[c] Third Embodiment

Figure 7:
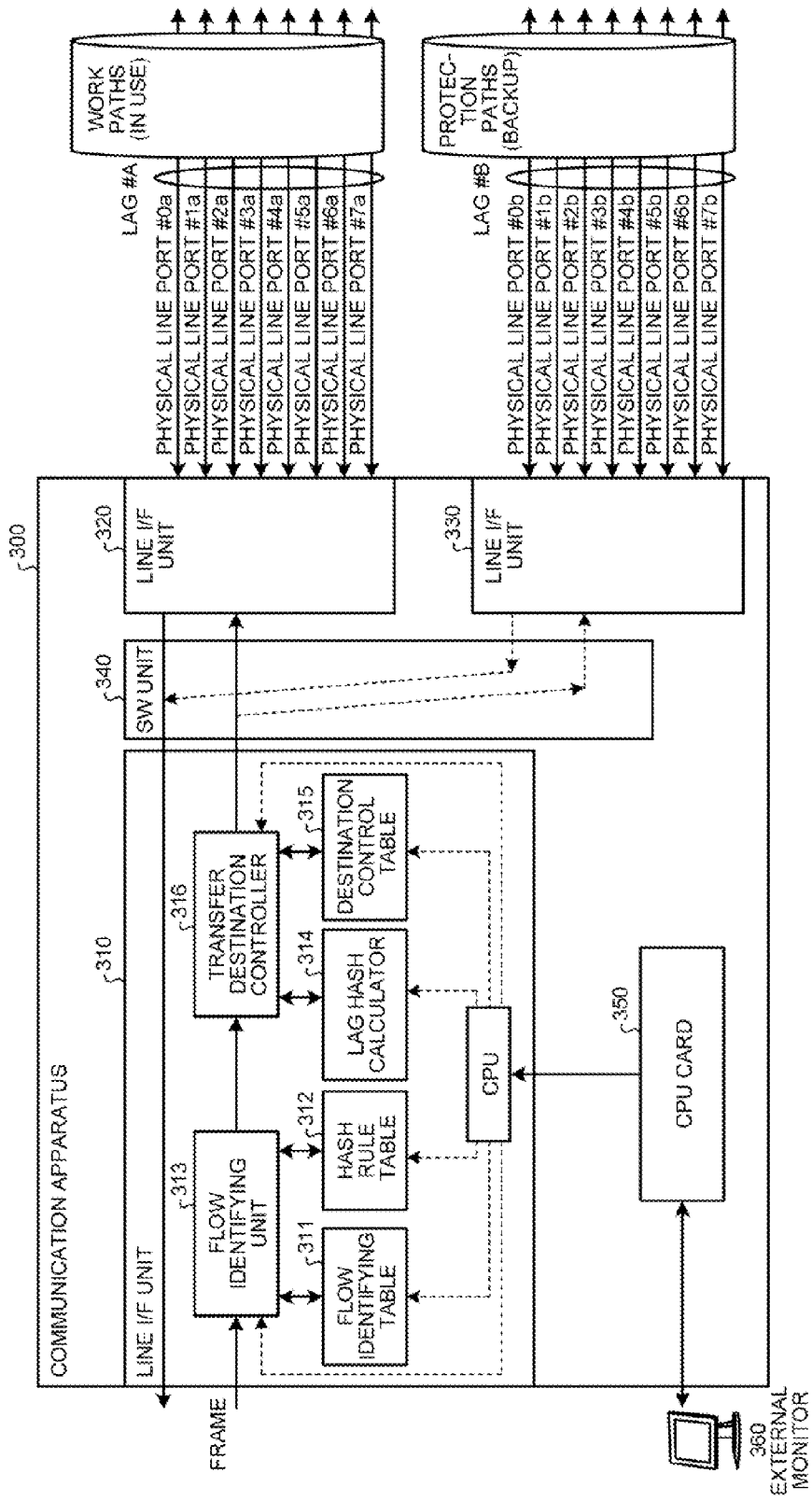
FIG. 7 is a schematic diagram of an exemplary configuration of a communication apparatus according to a third embodiment of the present invention.
Figure 11:
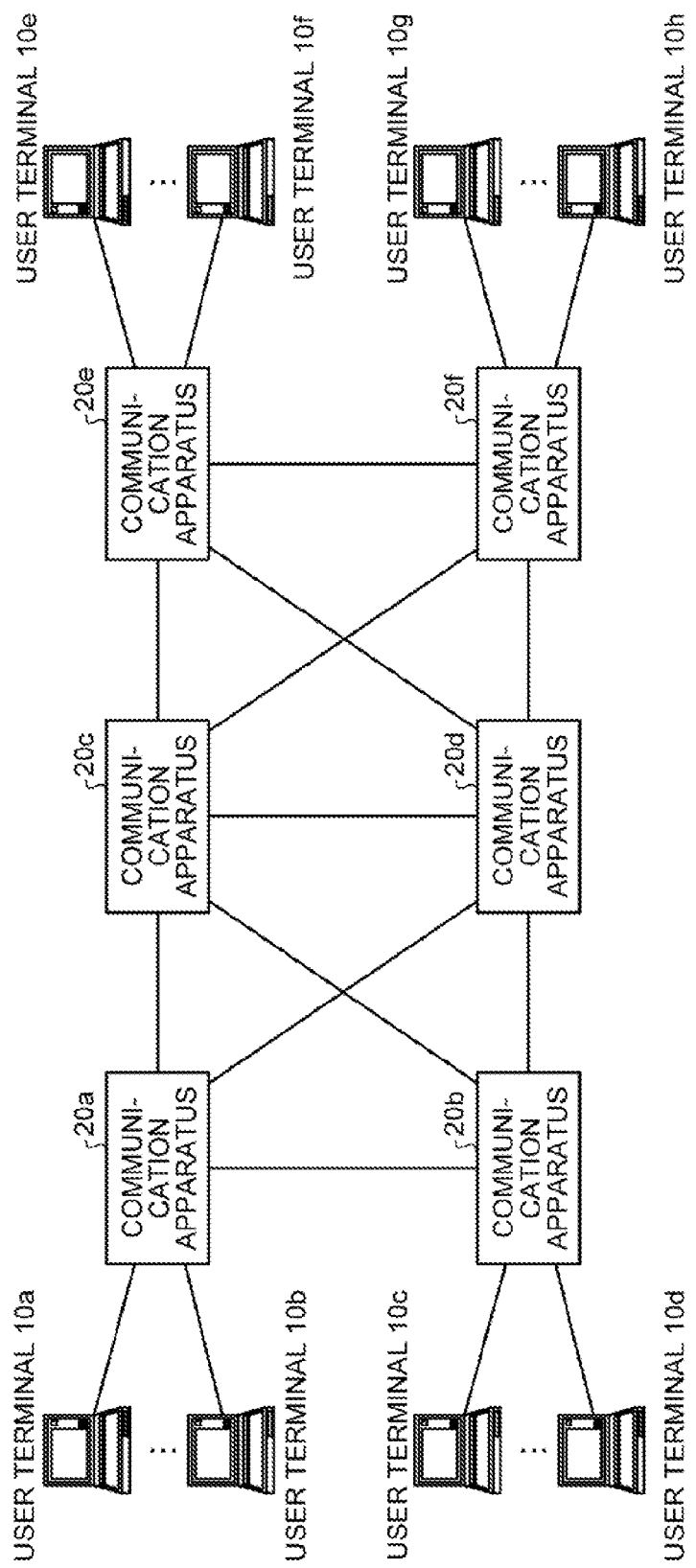
FIG. 11 is an exemplary configuration diagram of a conventional network.
Figure 12:
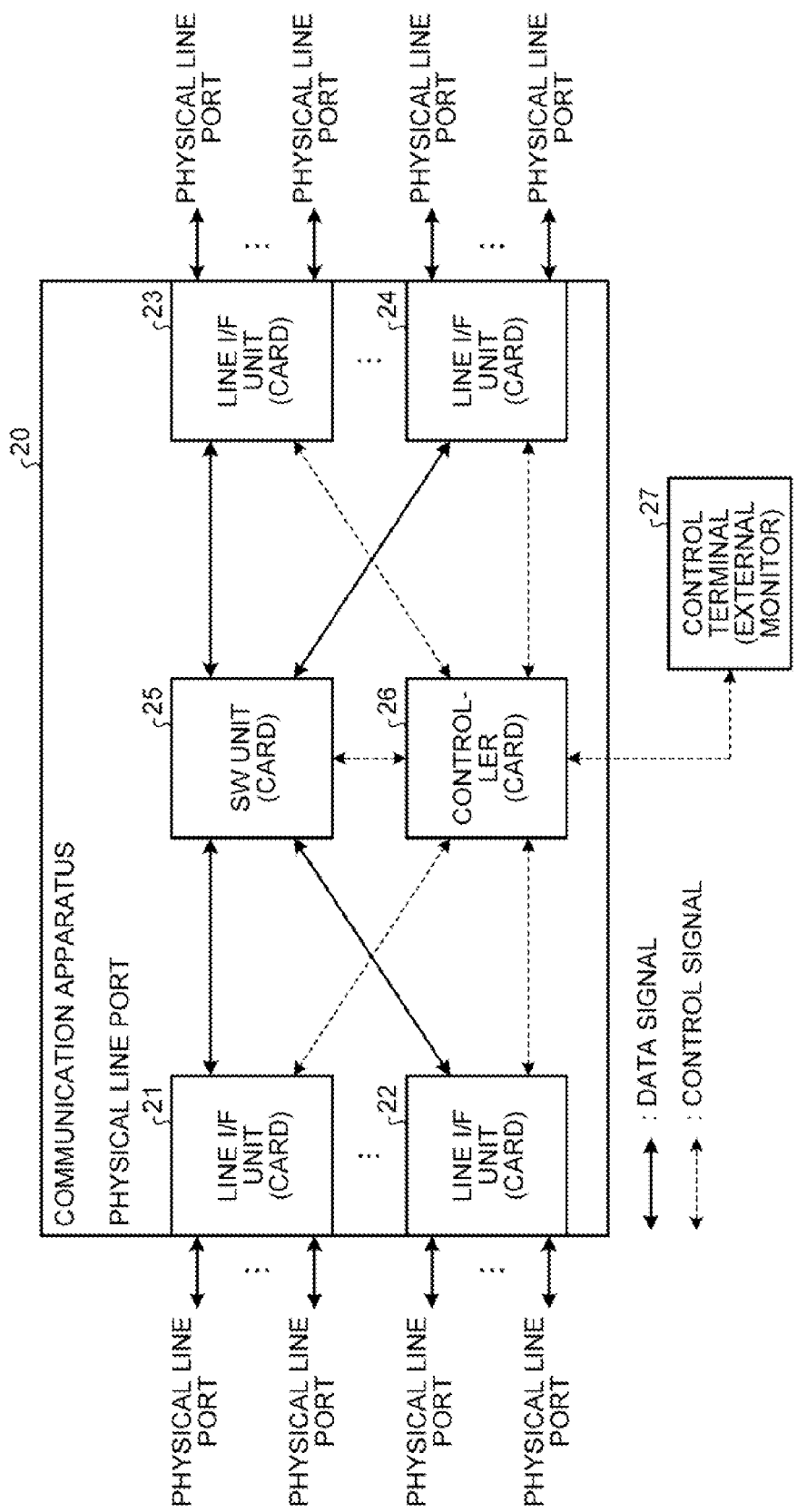
FIG. 12 is a schematic diagram of a configuration of a conventional communication apparatus.
Figure 13:
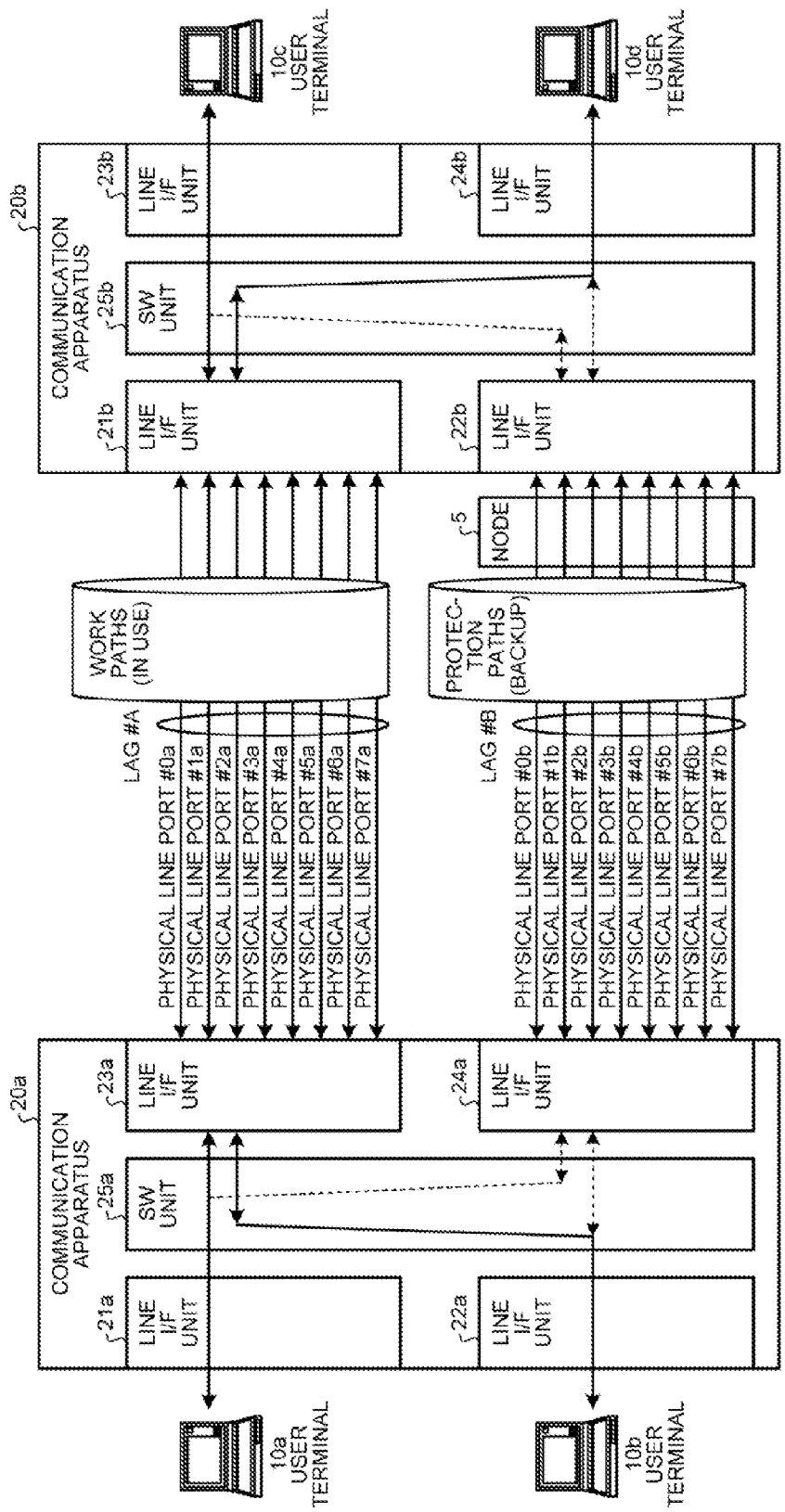
FIG. 13 is a configuration example of communication apparatuses having link aggregations constructed therebetween.
Figure 14:
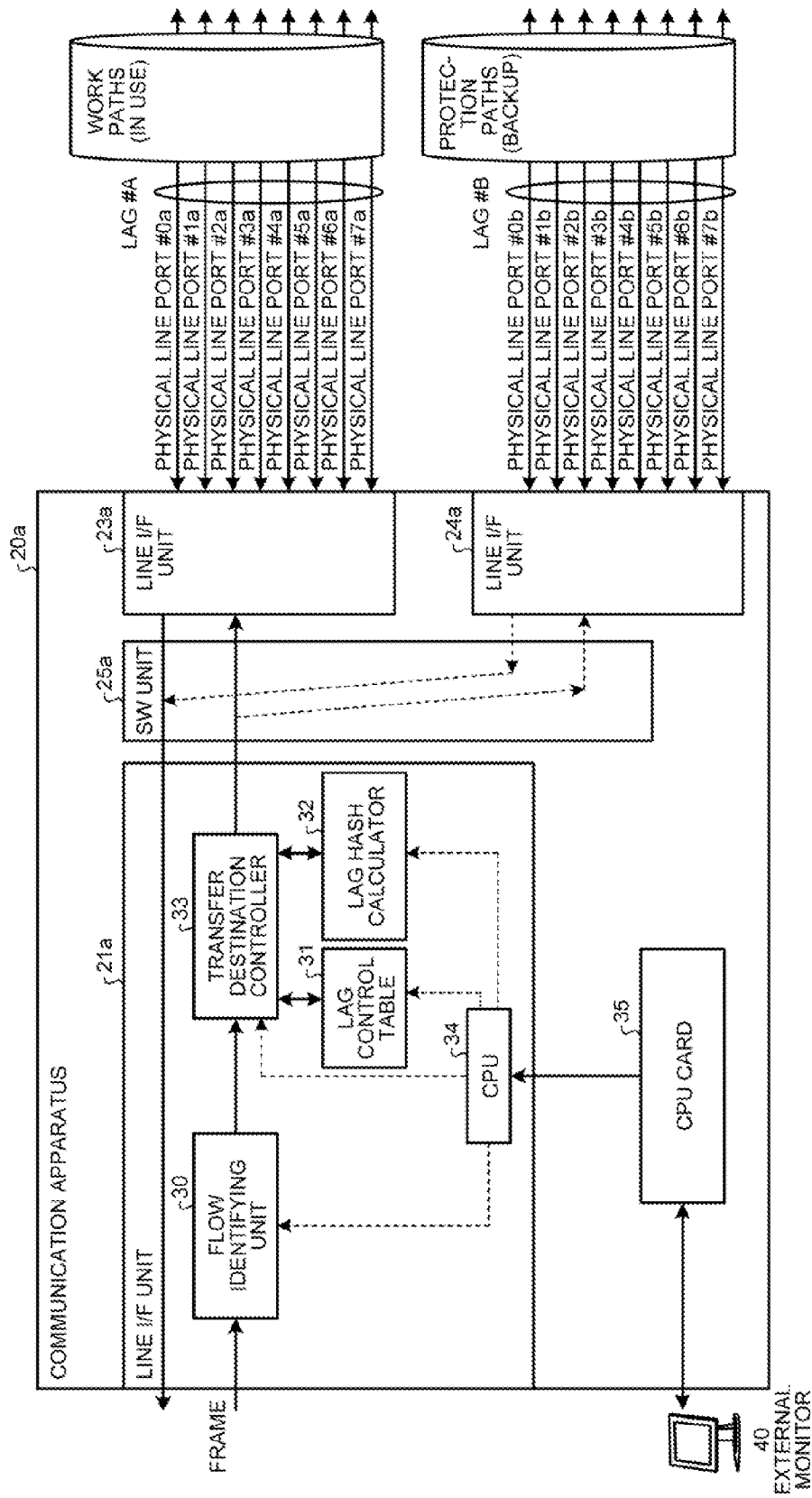
FIG. 14 is a schematic diagram of a configuration of a conventional line I/F unit.

Explained below is a configuration of a communication apparatus 300 according to a third embodiment of the present invention. FIG. 7 is a schematic diagram of an exemplary configuration of the communication apparatus 300 according to the third embodiment. As illustrated in FIG. 7, the communication apparatus 300 includes line I/F units 310 to 330, an SW unit 340, and a CPU card 350 that is connected to an external monitor 360.

Herein, the description regarding the SW unit 340, and the CPU card 350 is identical to the description regarding the SW unit 240, and the CPU card 250 according to the second embodiment.

The line I/F units 310 to 330 include a plurality of physical line ports and function as interfaces to external devices for performing frame communication processing. Herein, as an example, the line I/F unit 310 includes a plurality of physical line ports connected to an external user terminal; while each of the line I/F units 320 and 330 includes a plurality of physical line ports connected to another communication apparatus.

The line I/F unit 320 includes the physical line ports #0a to #7a. The communication apparatus 300 constructs a single virtual line by bundling the physical lines that are connected to the physical line ports #0a to #7a. Herein, the physical lines connected to the physical line ports #0a to #7a are collectively referred to as LAG #A.

The line I/F unit 330 includes the physical line ports #0b to #7b. The communication apparatus 300 constructs a single virtual line by bundling the physical lines that are connected to the physical line ports #0b to #7b. Herein, the physical lines connected to the physical line ports #0b to #7b are collectively referred to as LAG #B. Besides, in an identical manner to the second embodiment, the paths in the LAG #A are referred to as work paths, while the paths in the LAG #B are referred to as protection paths.

Generally, the line I/F units 310 to 330, the SW unit 340, and the CPU card 350 illustrated in FIG. 7 are provided in the form of detachable modules or cards. Alternatively, the line I/F units 310 to 330, the SW unit 340, and the CPU card 350 can be integrated with the motherboard.

Explained below is a configuration of the line I/F unit 310. As illustrated in FIG. 7, the line I/F unit 310 includes a flow identifying table 311, a hash rule table 312, a flow identifying unit 313, an LAG hash calculator 314, a destination control table 315, and a transfer destination controller 316.

The flow identifying table 311 stores types of services, flow IDs, and flow information of frames in a corresponding manner. The hash rule table 312 stores flow IDs and hash rules of frames in a corresponding manner.

When the flow identifying unit 313 obtains a frame; it determines the flow ID, the flow information, and the hash rule corresponding to that frame, and outputs the determination result along with the frame to the transfer destination controller 316. More particularly, the flow identifying unit 313 compares the type of service of the frame with the contents of the flow identifying table 311 and determines the flow ID and the flow information corresponding to that frame. Then, the flow identifying unit 313 compares the flow ID with the hash rule table 312 and determines the hash rule of that frame.

The LAG hash calculator 314 obtains, from the transfer destination controller 316, hash calculation target information and performs hash calculation based on that information. The LAG hash calculator 314 then outputs the hash values obtained as the calculation result to the transfer destination controller 316.

The LAG hash calculator 314 can calculate hash values by implementing any conventionally known method. For example, the LAG hash calculator 314 can calculate hash values by substituting the hash calculation target information in a predetermined hash function.

The destination control table 315 stores the combinations of the flow IDs and the hash values of frames in a corresponding manner with the physical line ports.

The transfer destination controller 316 receives frames and the corresponding determination results from the flow identifying unit 313 and accordingly determines physical line ports to which the frames are to be transferred. Then, the transfer destination controller 316 outputs those frames to the determined physical line ports. More particularly, the transfer destination controller 316 outputs, to the LAG hash calculator 314, the information inside a frame specified by the hash rule thereof and obtains the corresponding hash value from the LAG hash calculator 314. Then, the transfer destination controller 316 determines a physical line port by comparing the hash value and the flow ID of that particular frame with the contents of the destination control table 315.

Explained below is a data configuration of the flow identifying table 311 illustrated in FIG. 7. FIG. 8 illustrates an exemplary data configuration of the flow identifying table 311 according to the third embodiment. As illustrated in FIG. 8, the flow identifying table 311 stores the types of services, the flow IDs, and the flow information of frames in a corresponding manner. Herein, the flow information includes a hash execution determination flag, an MPLS offset, an IP offset, a VLAN offset, and additional information.

The types of services include service type 1 to service type 4 and an unregistered service type. For example, the service type 1 corresponds to MPLS over Ethernet (registered trademark), the service type 2 corresponds to VLAN over Ethernet (registered trademark), the service type 3 corresponds to IP over Ethernet (registered trademark), and the service type 4 corresponds to native Ethernet (registered trademark). Besides, as illustrated in FIG. 8, each of the service type 1 to the service type 4 is further divided into a plurality of service types.

The hash execution determination flag represents information for identifying whether hash calculation is to be performed. More particularly, when the hash execution determination flag for a frame is "1", the hash value of that frame is calculated. On the other hand, when the hash execution determination flag for a frame is "0", the hash value of that frame is not calculated and a predetermined hash value is used.

The offset information including the MPLS offset, the IP offset, the VLAN offset, and the additional information represents the information used by the LAG hash calculator 314 at the time of calculating hash values. For example, the offset information of frames represents positions in those frames at which the hash calculation target information is stored.

Explained below is a data configuration of the hash rule table 312 illustrated in FIG. 7. FIG. 9 illustrates an exemplary data configuration of the hash rule table 312 according to the third embodiment. As illustrated in FIG. 9, the hash rule table 312 stores the flow IDs and the hash rules of frames in a corresponding manner. For example, for "0" as the flow ID, the hash rule is "MAC address".

Explained below is a data configuration of the destination control table 315 illustrated in FIG. 7. FIG. 10 illustrates an exemplary data configuration of the destination control table 315 according to the third embodiment. As illustrated in FIG. 10, the destination control table 315 stores the flow IDs and the hash values of frames in a corresponding manner with physical line port numbers. Herein, physical line port numbers 1 to 7 respectively correspond to physical line ports #0 to #7.

For example, when the flow ID is "0" and the hash value is "0", the physical line port number is "0". Hence, the corresponding frame is output to the physical line port #0.

Given below is a specific description of the operations performed when the line I/F unit 310 obtains frames. Herein, firstly, the description is given for a case when the line I/F unit 310 obtains three frames having the same MAC address. The three frames are referred to as frames A, B, and C.

Herein, with reference to FIG. 8, it is assumed that the frame A has the service type 2 (TPID: 0x8100, VID: 0x001), the frame B has the service type 3 (type: 0x0800, IP DA: 102030405060), and the frame C has the service type 1 (type: 0x8847, label: level 3).

The flow identifying unit 313 compares the frames A, B, and C with the contents of the flow identifying table 311, and determines the flow ID and the flow information corresponding to each of those frames. Regarding the frame A; the flow ID is "10", the hash execution determination flag is "1", the VLAN offset is "12", and the other offsets are "0". Regarding the frame B; the flow ID is "20", the hash execution determination flag is "1", the IP offset is "26", and the other offsets are "0". Regarding the frame C; the flow ID is "1", the hash execution determination flag is "1", the MPLS offset is "12", the additional information is "3", and the other offsets are "0".

Upon determining the flow ID and the flow information corresponding to each of the frames A to C, the flow identifying unit 313 compares each flow ID with the contents of the hash rule table 312 and determines the hash rule of each frame. Since the frame A has the flow ID "10", the hash rule thereof is "VID" as illustrated in FIG. 9. Since the frame B has the flow ID "20", the hash rule thereof is "MAC address and IP address" as illustrated in FIG. 9. Since the frame C has the flow ID "1", the hash rule thereof is "MPLS label" as illustrated in FIG. 9.

Subsequently, the flow identifying unit 313 outputs, to the transfer destination controller 316, the determination results, i.e., the flow IDs, the flow information, and the hash rules in a corresponding manner to the frames A to C.

The transfer destination controller 316 then refers to the hash execution determination flags of the frames A to C and determines whether to calculate hash values of the frames A to C. Herein, since the hash execution determination flag is "1" for each of the frames A to C, the transfer destination controller 316 calculates the hash value of each frame.

The transfer destination controller 316 calculates the hash values using the LAG hash calculator 314. More particularly, based on the hash rules of the frames A to C, the transfer destination controller 316 obtains the hash calculation target information from those frames and outputs that information to the LAG hash calculator 314, and then obtains the respective hash values from the LAG hash calculator 314. In the following description, the hash calculation target information is referred to as a hash calculation key. In the third embodiment, it is assumed that the hash calculation key has the uniform data size of 128 bits.

The frame A has the hash rule "VID" and the VLAN offset "12". Based on that VLAN offset, the transfer destination controller 316 identifies a position inside the frame A at which the VID is stored and retrieves information from that position. Then, the transfer destination controller 316 generates a 128-bit hash calculation key by storing the VID information starting from the most significant bit (MSB) and appends a bit sequence of 0's in the remaining portion.

The frame B has the hash rule "MAC address and IP address" and the IP offset "26". The transfer destination controller 316 identifies the information stored at the MAC address inside the frame B and retrieves the identified information. Herein, the MAC address is assumed to be stored at the beginning of the frame. Besides, based on the IP offset, the transfer destination controller 316 identifies a position inside the frame B at which the IP address is stored and retrieves information from that position.

Meanwhile, the MAC address has the bit length of 96 bits and the IP address has the bit length of 64 bits. Thus, if the information stored at the MAC address and at the IP address is processed without any modification, then the bit length reaches 160 bits thereby exceeding the data size of a 128-bit hash calculation key. With regard to that problem, for example, the transfer destination controller 316 can be configured to retrieve 32 bits from the least significant bit (LSB) of the destination address (DA) and the least significant bit (LSB) of the source address (SA) inside the MAC address. By retrieving 32 bits each from the DA/SA, the information equivalent to 64 bits is obtained from the MAC address. Consequently, the information corresponding to the MAC address and the IP address can be limited to 128 bits in total. Herein, as long as the information corresponding to the MAC address and the IP address can be limited to 128 bits in total, there are no limitations on the processing performed on the MAC address and the IP address.

The frame C has the hash rule "MPLS label", the MPLS offset "12", and the additional information "3". Based on the MPLS offset, the transfer destination controller 316 identifies the information stored in the MPLS label inside the frame C. Besides, since the additional information is "3", the transfer destination controller 316 retrieves the MPLS label equivalent to three levels. Then, the transfer destination controller 316 appends a bit sequence of 0's to the retrieved information and generates a 128-bit hash calculation key.

Upon obtaining the hash calculation keys for the frames A to C, the transfer destination controller 316 outputs those hash calculation keys to the LAG hash calculator 314 and then obtains the hash values of the frames A to C from the LAG hash calculator 314. For example, the hash value of the frame A is "0", the hash value of the frame B is "1", and the hash value of the frame C is "7".

Subsequently, the transfer destination controller 316 compares the combinations of the flow IDs and the hash values of the frames A to C with the contents of the destination control table 315 and determines the physical line ports for the frames A to C. Since the frame A has the flow ID "10" and the hash value "0", the physical line port number thereof is "2" as illustrated in FIG. 10. Thus, the transfer destination controller 316 sends the frame A to the physical line port corresponding to the physical line port number 2.

Similarly, since the frame B has the flow ID "20" and the hash value "1", the physical line port number thereof is "3" as illustrated in FIG. 10. Thus, the transfer destination controller 316 sends the frame b to the physical line port corresponding to the physical line port number 3. Since the frame C has the flow ID "1" and the hash value "7", the physical line port number thereof is "7" as illustrated in FIG. 10. Thus, the transfer destination controller 316 sends the frame C to the physical line port corresponding to the physical line port number 7.

Explained below are the operations performed by the line I/F unit 310 when the hash execution determination flag is "0". Herein, as an example, the description is given with reference to a frame D having the service type 2 (TPID: 0x8100, VID: don't care).

The flow identifying unit 313 compares the frame D with the contents of the flow identifying table 311 and determines the flow ID and the flow information corresponding to the frame D. As illustrated in FIG. 8, regarding the frame D; the flow ID is "19" and the other offsets are "0".

Upon determining the flow ID and the flow information corresponding to the frame D, the flow identifying unit 313 compares that flow ID with the contents of the hash rule table 312 and determines the hash rule of the frame D. Since the frame D has the flow ID "19", the hash rule thereof is a predetermined value such as "0".

Subsequently, the flow identifying unit 313 outputs, to the transfer destination controller 316, the destination results, i.e., the flow ID, the flow information, and the hash rule in a corresponding manner to the frame D.

The transfer destination controller 316 then refers to the hash execution determination flag of the frame D and determines whether to calculate the hash value of the frame D. Herein, since the hash execution determination flag is "0" for the frame D, the transfer destination controller 316 does not calculate the hash value of the frame D and uses the hash value stored in the hash rule of the frame D. As illustrated in FIG. 9, in the hash rule of the frame D, the hash value "0" is stored.

Subsequently, the transfer destination controller 316 compares the combination of the flow ID and the hash value of the frame D with the contents of the destination control table 315 and determines the physical line port for the frame D. Since the frame D has the flow ID "19" and the hash value "0", the physical line port number thereof is "0" as illustrated in FIG. 10. Thus, the transfer destination controller 316 sends the frame D to the physical line port corresponding to the physical line port number 0.

In this way, by setting the hash execution determination flag to "0", the hash calculation operation can be omitted thereby enabling achieving reduction in the time taken for determining frame destinations. Besides, since the hash calculation is not performed, the power consumption can be curbed as compared to the case when the hash calculation is performed.

Explained below are the operations performed by the line I/F unit 310 when a frame with a registered service type and a frame having an unregistered service type are obtained. Herein, as an example, the description is given with reference to frames E and F. The frame E has the service type 4 (MAC DA: 0x123456789ABC, MAC SA: 0xDEF00FEDCBA9), while the frame F has an unregistered service type.

The flow identifying unit 313 compares the frames E and F with the contents of the flow identifying table 311, and determines the flow ID and the flow information corresponding to each of those frames. Regarding the frame E; the flow ID is "30", the hash execution determination flag is "1", and the offsets are "0". Regarding the frame F; the flow ID is "0", the hash execution determination flag is "1", and the other offsets are "0".

Upon determining the flow ID and the flow information corresponding to each of the frames E and F, the flow identifying unit 313 compares each flow ID with the contents of the hash rule table 312 and determines the hash rule of each frame. Since the frame E has the flow ID "30", the hash rule thereof is "flow ID" as illustrated in FIG. 9. Since the frame F has the flow ID "0", the hash rule thereof is "MAC address" as illustrated in FIG. 9.

Subsequently, the flow identifying unit 313 outputs, to the transfer destination controller 316, the flow IDs, the flow information, and the hash rules in a corresponding manner to the frames E and F.

The transfer destination controller 316 then refers to the hash execution determination flags of the frames E and F and determines whether to calculate hash values of the frames E and F. Herein, since the hash execution determination flag is "1" for each of the frames E and F, the transfer destination controller 316 calculates the hash value of each frame.

The transfer destination controller 316 calculates the hash values using the LAG hash calculator 314. More particularly, based on the hash rules of the frame E and F, the transfer destination controller 316 obtains the hash calculation target information from those frames and outputs that information to the LAG hash calculator 314 and then obtains the respective hash values from the LAG hash calculator 314.

The frame E has the hash rule "flow ID". Thus, the transfer destination controller 316 appends a bit sequence of 0's to the flow ID "30" corresponding to the frame E and generates a 128-bit hash calculation key.

The frame F has the hash rule "MAC address". Thus, the transfer destination controller 316 identifies the information stored at the MAC address inside the frame F and retrieves the identified information. Then, the transfer destination controller 316 appends a bit sequence of 0's to the retrieved information and generates a 128-bit hash calculation key.

Upon obtaining the hash calculation keys for the frames E and F, the transfer destination controller 316 outputs those hash calculation keys to the LAG hash calculator 314 and then obtains the hash values of the frames E and F from the LAG hash calculator 314. For example, the hash value of the frame E is "0" and the hash value of the frame F is "1".

Subsequently, the transfer destination controller 316 compares the combinations of the flow IDs and the hash values of the frames E and F with the contents of the destination control table 315 and determines the physical line ports for the frames E and F. Since the frame E has the flow ID "30" and the hash value "0", the physical line port number thereof is "7" as illustrated in FIG. 10. Thus, the transfer destination controller 316 sends the frame E to the physical line port corresponding to the physical line port number 7.

Since the frame F has the flow ID "0" and the hash value "1", the physical line port number thereof is "1" as illustrated in FIG. 10. Thus, the transfer destination controller 316 sends the frame F to the physical line port corresponding to the physical line port number 1.

As described above, on the basis of the combinations of the flow IDs and the hash values of frames, the line I/F unit 310 in the communication apparatus 300 according to the third embodiment divides those frames among the physical line ports. Hence, even if some frames have an identical destination and even if the hash value of each frame is identical, the frames can be prevented from getting concentrated at a particular physical line port. Meanwhile, herein, a hash calculation key can be set in an arbitrary manner. For example, the combination of the MAC address and the IP address can be set as the hash calculation key.

Moreover, in the communication apparatus 300 according to the third embodiment, by setting the hash execution determination flag to "0"; the hash calculation operation can be omitted. That enables achieving reduction in the time taken for determining frame destinations as well as achieving reduction in the power consumption.

Furthermore, in the communication apparatus 300 according to the third embodiment, frame IDs and hash rules are set also for the frames having unregistered service types. Thus, even if frames having an unregistered service type are obtained, it is possible to allot those frames among the physical line ports. Besides, even if information other than the information stored in frames is used, it is possible to generate hash calculation keys for those frames and thus to allot those frames among the physical line ports. In the abovementioned examples, the hash calculation keys are generated using the flow IDs.

Meanwhile, the CPU card 350 outputs the information set in the flow identifying unit 313, the flow identifying table 311, the hash rule table 312, the LAG hash calculator 314, the destination control table 315, and the transfer destination controller 316 to the external monitor 360. That allows the administrator to verify the information set in the flow identifying table 311, the hash rule table 312, and the destination control table 315. Thus, for example, in case a trouble occurs in a particular physical line port, the administrator can delete the physical line port number of the faulty physical line port from the destination control table 315 by operating an input device.

Meanwhile, The constituent elements of the device illustrated in the drawings are merely conceptual, and need not be physically configured as illustrated. The constituent elements, as a whole or in part, can be separated or integrated either functionally or physically based on various types of loads or use conditions. For example, the line I/F units 210 to 230, the SW unit 240, and the CPU card 250 can be disposed in a single card.

Moreover, the configuration of the communication apparatus 200 according to the second embodiment is to be construed as embodying all modifications and alternative constructions that may occur to one skilled in the art that fairly fall within the basic teaching herein set forth. For example, the functions of the line I/F unit 210 can be realized in the form of software, which can then be executed in a computer for implementing the functions equivalent to the line I/F unit 210.

According to an aspect of the present invention, it becomes possible to make effective use of a plurality of physical lines.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a flow identifying unit that obtains, out of a plurality of calculation targets included in an input frame, a specific calculation target corresponding to a specific flow to which the input frame belongs;
a transfer destination controller that decides on an output port corresponding to a combination of the specific flow and a hash value calculated from the specific calculation target, based on a table in which flows, hash values and ports are associated with each other; and
a frame output unit that outputs the input frame to the output port decided by the transfer destination controller.

2. The communication apparatus according to claim 1, wherein
based on a flow identifier of the specific flow, the flow identifying unit obtains flow information that includes an execution determination flag regarding hash value calculation, and
when hash value calculation is determined unnecessary based on the flow information, then, instead of performing hash value calculation for the flow identifier, the transfer destination controller sets a hash rule corresponding to the flow identifier as a hash value of the flow identifier.

3. The communication apparatus according to claim 2, wherein
the hash rule includes information for identifying hash calculation target information from among information included in the input frame, and
the transfer destination controller performs hash value calculation based on the hash calculation target information.

4. The communication apparatus according to claim 2, wherein
the hash rule includes two or more pieces of information for identifying hash calculation target information from among information included in the input frame, and the transfer destination controller performs hash value calculation based on the hash calculation target information.

5. The communication apparatus according to claim 2, wherein
the hash rule includes the flow identifier, and
when the hash rule represents a flow identifier, the transfer destination controller calculates the hash value based on the flow identifier.

6. A frame transmission method of a communication apparatus, the frame transmission method comprising:
obtaining, out of a plurality of calculation targets included in an input frame, a specific calculation target corresponding to a specific flow to which the input frame belongs;
deciding on an output port corresponding to a combination of the specific flow and a hash value calculated from the specific calculation target, based on a table in which flows, hash values and ports are associated with each other; and
outputting the input frame to the decided output port.

7. The frame transmission method according to claim 6, wherein
the obtaining includes obtaining, based on a flow identifier of the specific flow, flow information that includes an execution determination flag regarding hash value calculation, and
the deciding includes setting, when hash value calculation is determined unnecessary based on the flow information, the hash rule corresponding to the flow identifier as a hash value of the flow identifier instead of performing hash value calculation for the flow identifier.

8. A non-transitory computer readable storage medium having stored therein a frame transfer program, the program causing a computer to execute a process comprising:
obtaining, out of a plurality of calculation targets included in an input frame, a specific calculation target corresponding to a specific flow to which the input frame belongs;
deciding on an output port corresponding to a combination of the specific flow and a hash value calculated from the specific calculation target, based on a table in which flows, hash values and ports are associated with each other; and
outputting the input frame to the decided output port.

9. The non-transitory computer readable storage medium according to claim 8, wherein
the obtaining includes obtaining, based on a flow identifier of the specific flow, flow information that includes an execution determination flag regarding hash value calculation, and
the deciding includes setting, when hash value calculation is determined unnecessary based on the flow information, the hash rule corresponding to the flow identifier as a hash value of the flow identifier instead of performing hash value calculation for the flow identifier.

* * * * *